United States Patent [19]

Jensen et al.

[11] Patent Number: 5,482,340
[45] Date of Patent: Jan. 9, 1996

[54] ARTICULATING OVERHEAD MANDREL MANIPULATOR

[75] Inventors: Donald A. Jensen, Kent; Hassan Faraz, Bothell; Joel M. Thomas, Kent, all of Wash.

[73] Assignee: The Boeing Company, Seattle, Wash.

[21] Appl. No.: 299,929

[22] Filed: Aug. 31, 1994

[51] Int. Cl.$^6$ ........................................... B66C 1/62
[52] U.S. Cl. ........................ 294/81.51; 294/87.1
[58] Field of Search ............................ 294/81.5, 81.51, 294/81.6, 81.61, 86.4, 87.1, 67.31, 907; 414/736

[56] References Cited

U.S. PATENT DOCUMENTS

| | | | |
|---|---|---|---|
| 3,987,905 | 10/1976 | Dechantsreiter | 294/81.61 |
| 4,360,110 | 11/1982 | Sigman et al. | 212/159 |
| 4,506,923 | 3/1985 | Walker et al. | 294/87.1 |
| 4,736,971 | 4/1988 | McManus | 294/87.1 |
| 5,163,804 | 11/1992 | Kobayashi | 414/739 |

Primary Examiner—Dean Kramer
Attorney, Agent, or Firm—Christensen, O'Connor, Johnson & Kindness

[57] ABSTRACT

An overhead mandrel manipulator for handling two composite lay-up mandrels. The manipulator includes two opposing brackets (124) having arms (135) that engage the composite lay-up mandrels using lift pins (150). The opposing brackets (124) are rotated approximately 90° each between an open position and a closed position. In the open or closed positions, the brackets are easily attached to the composite lay-up mandrels. When the brackets are moved between the open and closed positions, they rotate the lay-up mandrels approximately 90°. The brackets can be used to apply a compressive force to the two lay-up mandrels when the brackets are in the closed position. The brackets (124) are rotated by a push plate (80) that is driven up and down by a Thomson ball screw (98) connected to a drive motor (30). As the push plate (80) moves up and down, it moves two pairs of drive links (128) upward and downward. The drive links are pivotally connected to the opposing brackets such that movement of the drive links causes the brackets to rotate when the push plate moves up or down.

14 Claims, 10 Drawing Sheets

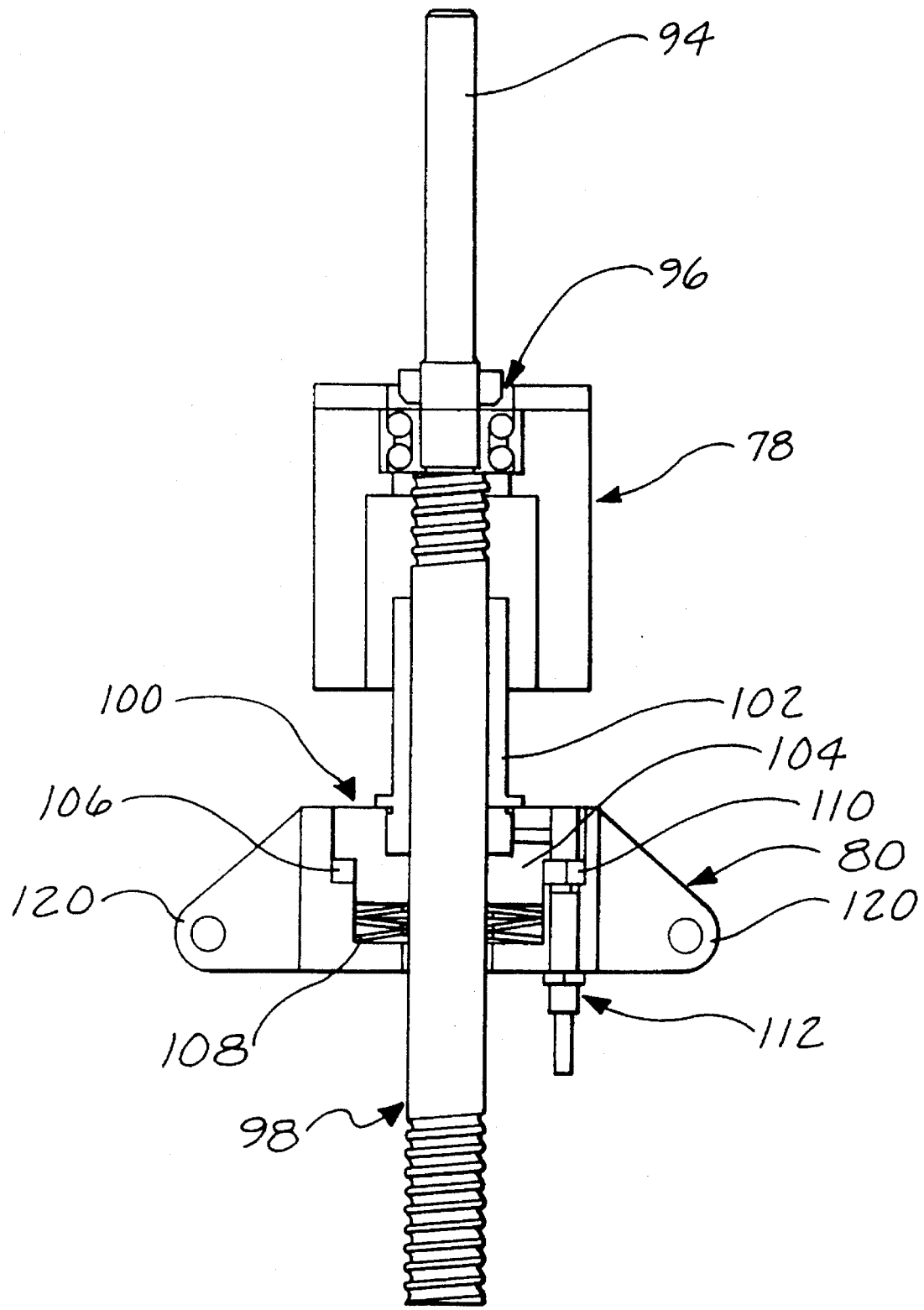
sig. 14.

ARTICULATING OVERHEAD MANDREL MANIPULATOR

FIELD OF THE INVENTION

The present invention relates to apparatus for manufacturing composite structures, more specifically, to apparatus for manipulating composite lay-up mandrels.

BACKGROUND OF THE INVENITON

The use of composite materials in the manufacture of aircraft and other lightweight structures has increased steadily since the introduction of such materials. Composite materials have a high strength-to-weight ratio and stiffness, making them attractive in the design of lightweight structures. One drawback to using composite materials in the past has been high fabrication costs. It has been difficult to produce composite parts for the same cost as comparable metal parts. The cost differential is especially notable in large-scale parts or parts having abrupt or complex contours.

One of the largest contributors to composite structure costs is the amount of manual labor required during fabrication. Composite parts having abrupt or complex contours must be formed by manually laying up individual layers of composite material on a lay-up mandrel. Larger parts having more gradual contours, for example, large wing skins, may be fabricated using automated tape laying machines.

Automated tape laying machines have a robotic arm that places individual layers of composite prepreg on a mandrel to form a composite part. Automated tape laying machines can place individual layers of prepreg at a high rate, thus possibly reducing fabrication time and cost. The mechanics of the automated tape laying machine limits its ability to place layers of composite prepreg over some geometries. Automated tape laying machines generally cannot place composite prepreg around abrupt curvatures or tight radiuses of curvature.

A common composite support structure used in the construction of aircraft and other light-weight structures is the "I"-beam or "I"-stringer. Due to abrupt curvatures, I-beams, and other beam-type composite structures are generally formed by manually placing layers of composite material over a lay-up mandrel. An automated cutting machine is used to cut each layer of composite prepreg to the proper shape. The individual layers of prepreg are then placed on two separate lay-up mandrels by hand. Once properly positioned, each layer of prepreg is manually formed to the exterior contours of the lay-up mandrel to form two "C-channels."

The C-channels and lay-up mandrels are then rotated so that the C-channels can be joined together along their vertical webs to form an I-beam. After joining, a triangular composite radius filler is placed in the triangular recesses formed in the center of the top and bottom flanges during joining. Top and bottom composite reinforcement layers are then manually placed on the top and bottom of the I-beam The resulting I-beam is then bagged and autoclave cured.

The entire I-beam fabrication process is labor intensive and time consuming. In addition to the labor required to place the composite material, labor is also required to manipulate the lay-up mandrels. Generally, lay-up mandrels are quite large and heavy, making them difficult and hazardous to maneuver. After the two C-channels are formed, a crane or similar handling device is used to engage the individual lay-up mandrels and transport them to an assembly table. The mandrels are then manually maneuvered, rotated and aligned using levers etc. The two channels are then bonded together using a vacuum membrane in a laborius, time-consuming process. Once bonded, a triangular radius filler is added to the top. The lay-up mandrels are then rotated 180° so that a triangular radius filler may be applied to the bottom of the I-beam. Finally, the resulting I-beam and lay-up mandrels must be placed on a curing mandrel for vacuum bagging and subsequent curing.

In addition to being costly, the extensive use of manual labor during the fabrication process produces quality control problems. Individual layers of composite prepreg are often incorrectly positioned. Extensive manual handling during fabrication also increases the likelihood of foreign materials being introduced into the completed part. Incorrectly placed layers of composite and foreign material are large contributors to overall part rejection rates.

Thus, a need exists for methods and apparatus that reduce the amount of manual labor required during the fabrication of structures, particularly large structures, from composite materials. The present invention is directed to meeting this need.

SUMMARY OF THE INVENTION

The present invention is an overhead manipulator that allows two elongate composite lay-up mandrels to be easily moved and manipulated. The overhead manipulator includes a plurality of mandrel manipulators mounted on an overhead support. Each of the mandrel manipulators includes a vertical extension and retraction mechanism and an articulating arm assembly. The extension and retraction mechanisms move the articulated arm assemblies between retracted and extended positions. In the retracted position, each articulating arm assembly lies adjacent the overhead support, while in an extended position each articulated arm assembly is spaced away from the overhead support. Each articulated arm assembly includes a pair of opposed rotatable brackets and a mechanism for coupling the brackets to the elongate composite mandrels. The brackets are rotatable between an open position and a closed position. Rotation of the brackets between the open and closed positions rotates attached composite lay-up mandrels approximately 90°. The composite lay-up mandrels may be detached from the opposing brackets when in either position. Each articulating arm assembly also includes a drive motor that moves the brackets between the open and closed positions in response to an operator's input.

In accordance with other aspects of the invention, the mechanism for coupling the brackets to the mandrels includes a pin block that is pivotally attached to each bracket and lift pin. The composite lay-up mandrels are attached to the pin blocks by inserting the lift pins through the pin blocks into the composite mandrels.

In accordance with other aspects of the invention, the extension and retraction mechanism biases the articulating arm assemblies into the retracted position.

In accordance with further aspects of this invention, in addition to rotating the composite lay-up mandrels, the brackets also apply a compressive force to push the two composite lay-up mandrels together. Preferably, each of the articulating arm assemblies includes an apparatus that prevents the compressive force applied to the composite lay-up mandrels from exceeding a predetermined value.

The present invention allows composite lay-up mandrels to be easily picked up and rotated during the fabrication process. In addition, the invention is capable of pressing the composite lay-up mandrels together. The invention is particularly useful in the fabrication of composite I-beams. In such an application, the invention can be used to pick up the composite lay-up mandrels after two composite C-sections have been formed around the mandrels. The invention can then be used to rotate the lay-up mandrels and place them in additional fabrication equipment. After a composite I-beam has been formed, the present invention could be reattached to the composite lay-up mandrels and used to remove the I-beam and the mandrels from the additional fabrication equipment. The invention can be used to apply a compressive force to the lay-up mandrels to maintain the lay-up mandrels and composite I-beam together during subsequent transportation to vacuum bagging and curing equipment.

Use of the present invention reduces the amount of manual labor involved in the fabrication process. The invention may be used with equipment disclosed in copending patent applications to achieve further improvements in composite fabrication methods. In one of the other copending applications, a method and apparatus for vacuum forming the individual composite charges into C-sections is disclosed. In another of the patent applications, a method and apparatus for joining two C-sections to form an I-beam is disclosed. In yet another patent application, a method and apparatus for removing lay-up mandrels from a cured composite part is disclosed.

BRIEF DESCRIPTION OF THE DRAWING

The foregoing aspects and many of the attendant advantages of this invention will become more readily appreciated as the same becomes better understood by reference to the following detailed description, when taken in conjunction with the accompanying drawings, wherein:

FIG. 14 is an enlarged, partial cross-sectional view of the Thomson ball screw and push block of the articulating arm assembly of the mandrel manipulator of FIG. 2.

DETAILED DESCRIPTION OF THE PREFERRED EMBODIMENT

Figure 1:
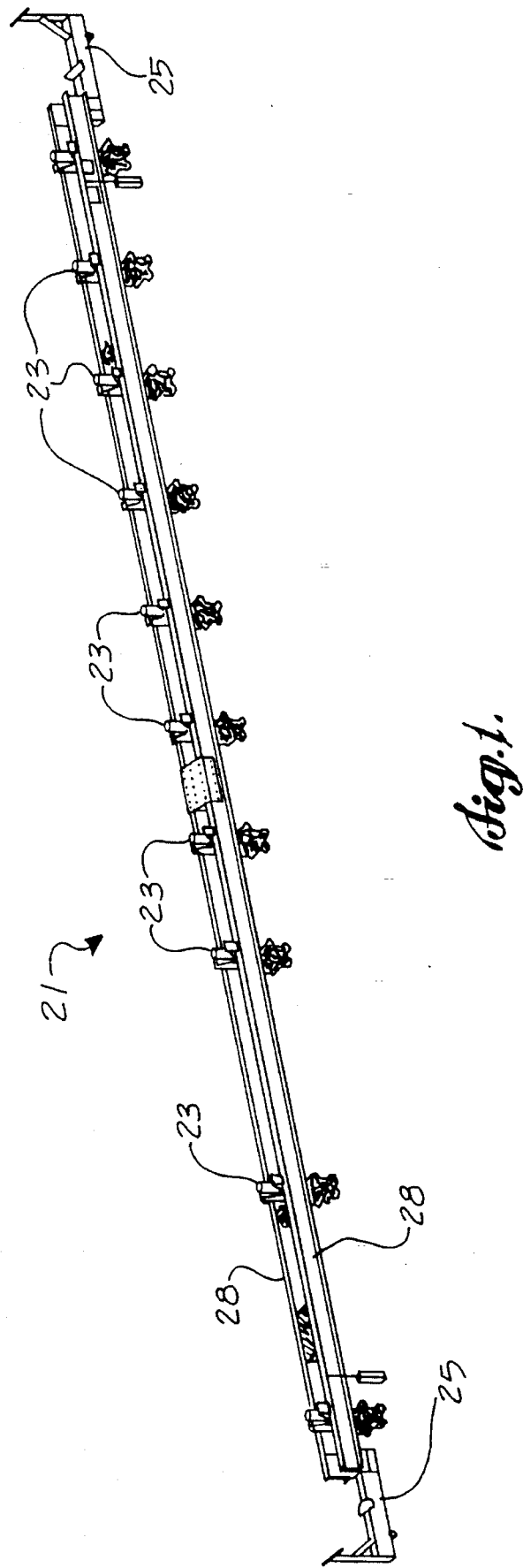
FIG. 1 is a perspective view of an overhead mandrel manipulator formed in accordance with the present invention.
Figure 2:
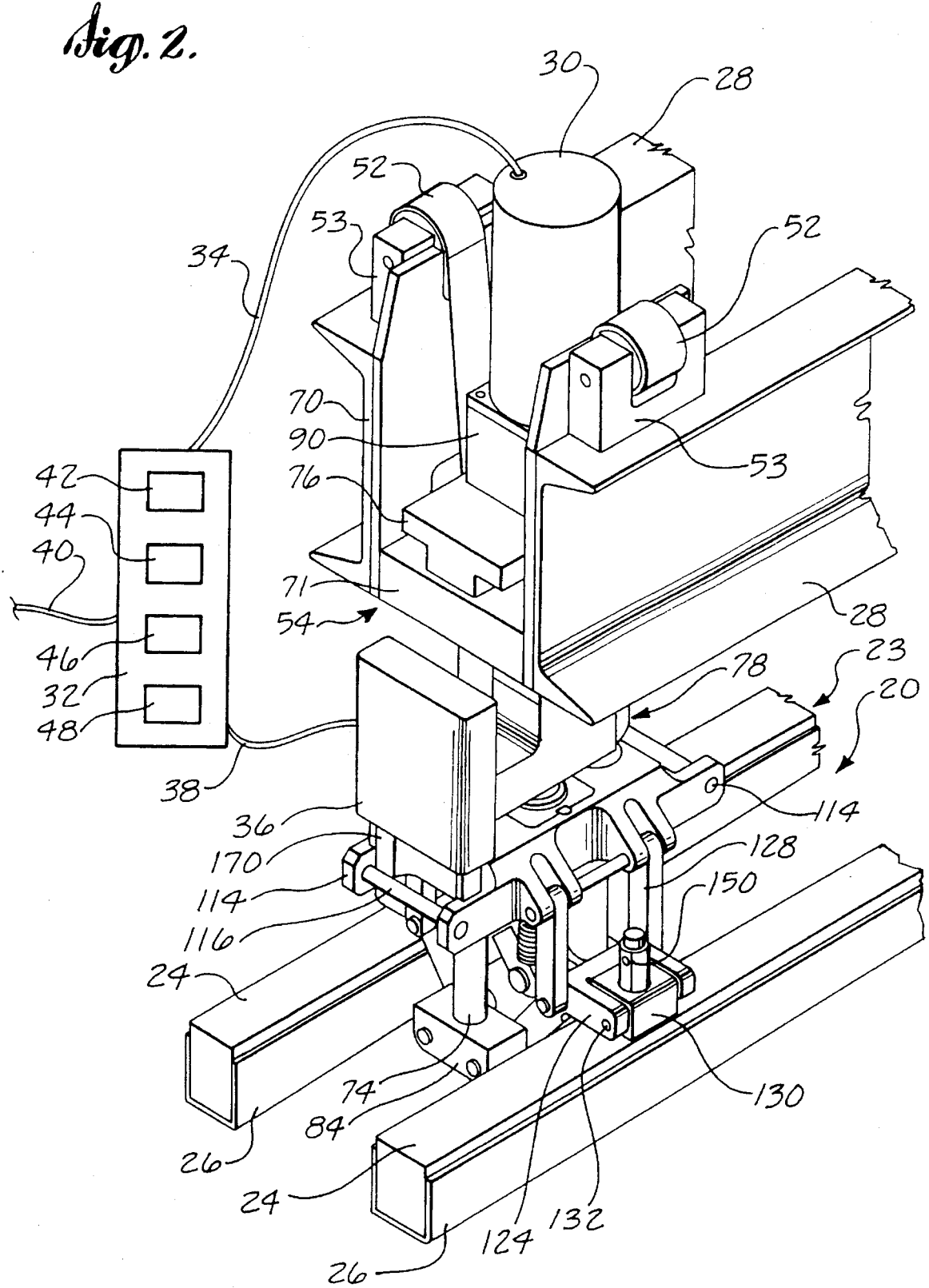
FIG. 2 is an enlarged perspective view of one of the mandrel manipulators of FIG. 1.

An overhead composite mandrel manipulator 21 formed in accordance with the present invention is illustrated in FIG. 1. More specifically, FIG. 1 illustrates a plurality of mandrel manipulators 23 mounted on an overhead support formed by a pair of elongate C-shaped support beams 28. As shown in FIG. 2, the C-shaped support beams are positioned in a spaced-apart back-to-back relationship. Also shown in FIG. 1 are a pair of handling trucks 25 that can be used to transport the overhead composite mandrel manipulator by use of a separate crane system from location to location where other (not shown) mechanisms can be used to guide the overhead composite mandrel manipulator into position.

The overhead composite mandrel manipulator illustrated in FIG. 1 is designed to move and manipulate a pair of elongate composite lay-up mandrels 24 (FIG. 2) during the manufacture of composite structures. The composite lay-up mandrels 24 are used to form composite 1-beams. The resulting composite 1-beams are used to reinforce aircraft structures, such as the wing skins of commercial airplanes. Alternate embodiments of the invention could be used to manipulate mandrels used to form other structures.

Generally, the composite lay-up mandrels 24 used in the fabrication of 1-beams for airplane wings are on the order of 10–45 feet long. In order to engage and manipulate such mandrels, as noted above, a plurality of mandrel manipulators 23 are mounted along the length of the overhead support beams 28. As shown in FIG. 2, each of the mandrel manipulators includes an articulating arm assembly 20 that moves in unison with the arm assemblies of the other manipulators to engage and move the composite lay-up mandrels. Each arm assembly 20 includes a drive motor 30 that is electrically connected to an indicator panel 32 and electrical control system (not shown) such as a programmable logic controller through a cable 34. The electrical control system and control panel 32 includes position indicator lights and the electronics used to control the operation of the articulating arm assemblies in the manner described below.

The electrical control system and control panel are also electrically connected to a sensor box 36, mounted on one side of each articulating arm assembly 20, by an electrical cable 38. As described below, the sensor box 36 includes a series of proximity switches and proximity targets. The proximity switches and targets provide the indicator panel 32 information on the position and movement of the associated articulating arm assembly 20. The drive motor 30, sensing box 36, and indicator panel 32 are connected to a power supply (not shown) through an electrical cable 40.

In the preferred embodiment, the indicator panel 32 includes four illuminated indicators, a full open indicator 42, a half-inch open indicator 44, a closed and compressed indicator 46 and a loose connection indicator 48. The respective indicator is illuminated when the arm assembly 20 is in the appropriate position, as described below.

Figure 9:
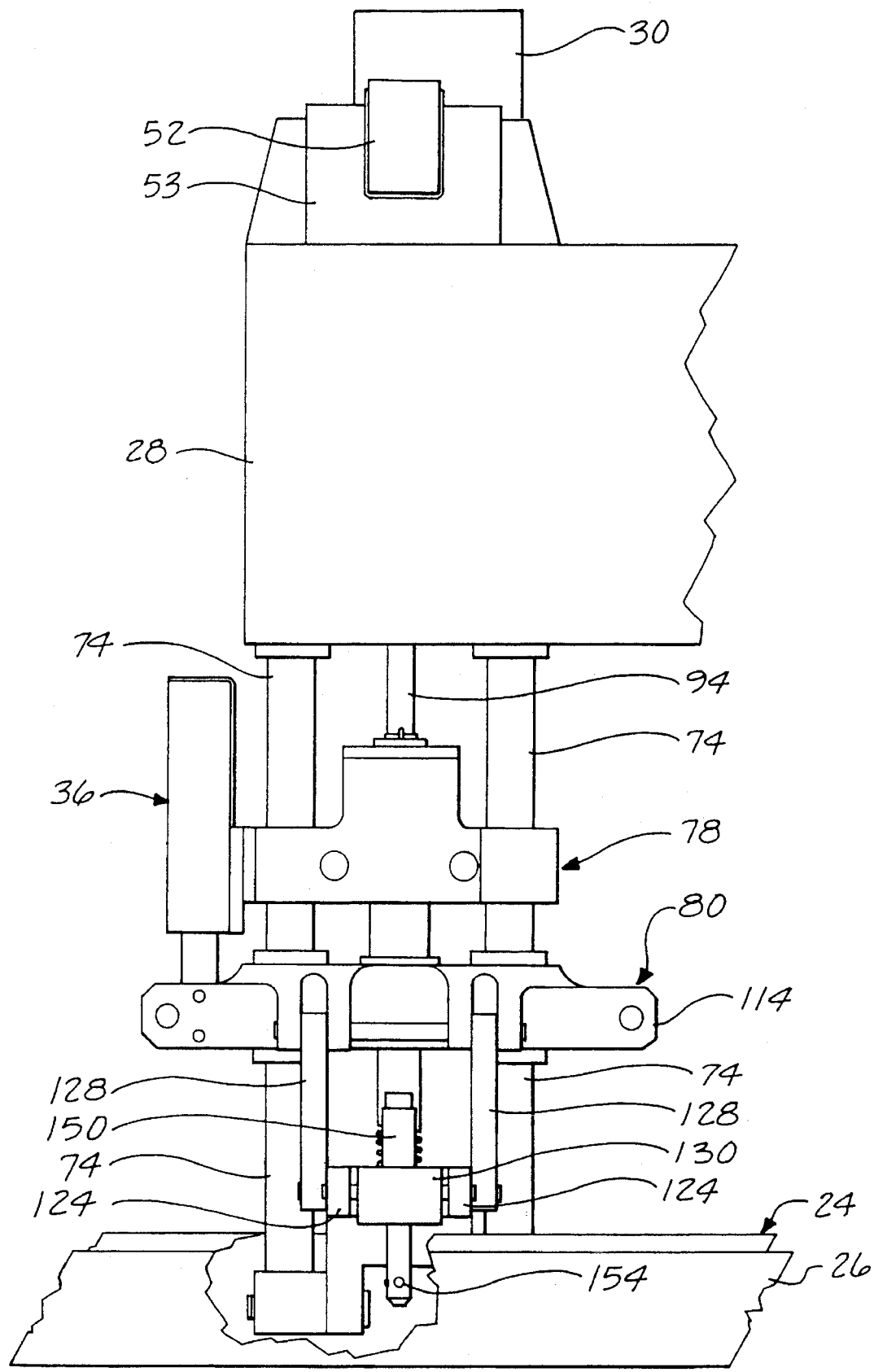
FIG. 9 is a side, partial cut-away view of the mandrel manipulator of FIG. 2.

Each mandrel manipulator 23 also includes an extension and retraction mechanism 54 (FIGS. 2 and 9) that is connected to the support beams 28. Each extension and retraction mechanism includes a yoke assembly that includes a pair of spaced-apart vertical flanges 70, one attached to the facing surface of each of the support beams 28 in any suitable way such as bolting and welding. The yoke assembly also includes a cross-member 71 that is attached to and spans the distance between the flanges 70, at the bottom of the flanges.

The extension and retracting mechanism 54 also includes a motor mount 76, a pair of vertical shafts 74, a bearing block 78, and a pair of constant force springs 52. The motor mount is a plate located above the cross-member 71 and attached to the upper end of the vertical shafts 74. The vertical shafts pass through bushings 72 mounted in the cross-member 71 of the yoke assembly. The bearing block is located beneath the cross-member and attached to a midregion of the vertical shafts 74. The vertical shafts extend downwardly and are attached to the articulating arm assembly 20 in the manner described below.

The bearing block 78 is spaced a sufficient distance apart from the motor mount 76 to allow the shafts 74 to slide up and down within the yoke assembly. The bearing block 78 is rigidly attached to the two shafts 74 so that it maintains the shafts at a predetermined distance apart. The combination of the bearing block 78, motor mount 76, and bushings 72 maintain the shafts 74 in a fixed relationship with respect to each other. This ensures that the shafts 74 will not bind within the bushings 72 as the shafts slide up and down.

The constant force springs 52 are supported by U-shaped brackets 53 mounted atop the support beams 28, one on either side of the motor mount. The ends of the extension elements of the constant force springs are connected to the facing side of the motor mount.

Figure 4:
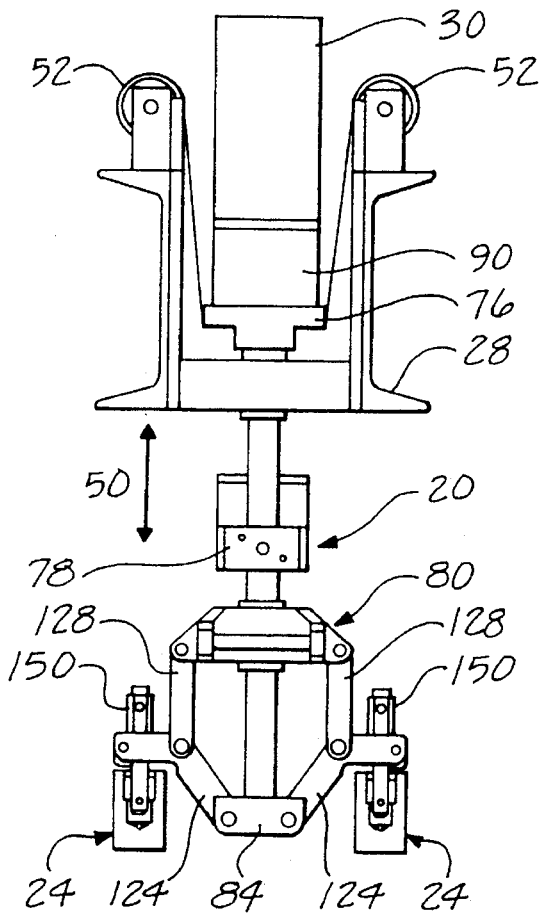
FIG. 4 is a side elevational view of the mandrel manipulator of FIG. 2 illustrated in an extended position.
Figure 3:
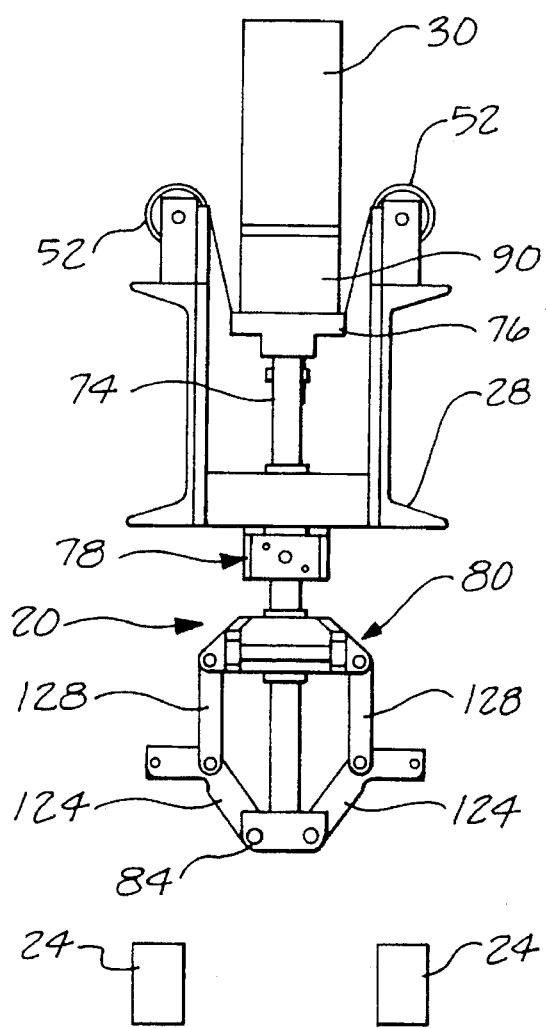
FIG. 3 is a side elevational view of the mandrel manipulator of FIG. 2 illustrated in a retracted position.

As shown in FIGS. 3 and 4, each articulating arm assembly 20 is movable between a retracted position (FIG. 3) in which the arm assembly is raised to a location adjacent to the lower surface of the support beams 28 and an extended position (FIG. 4) in which the arm assembly is spaced downward from the lower surface of the support beams 28. The articulating arm assembly 20 is biased into the retracted position by the two constant force springs 52.

The articulating arm assemblies 20 are moved between the extended and retracted positions by pulling down on opposing elongate handles 116 (FIG. 12) that extend between arms 114 located at opposite ends of the push plate 80. The handles lie orthogonal to the longitudinal axes of the support beams 78. When an operator pulls down on an articulating arm assembly 20, the shafts 74 slide through the cross-member 71 of the extension and retraction mechanism 54.

Figure 10:
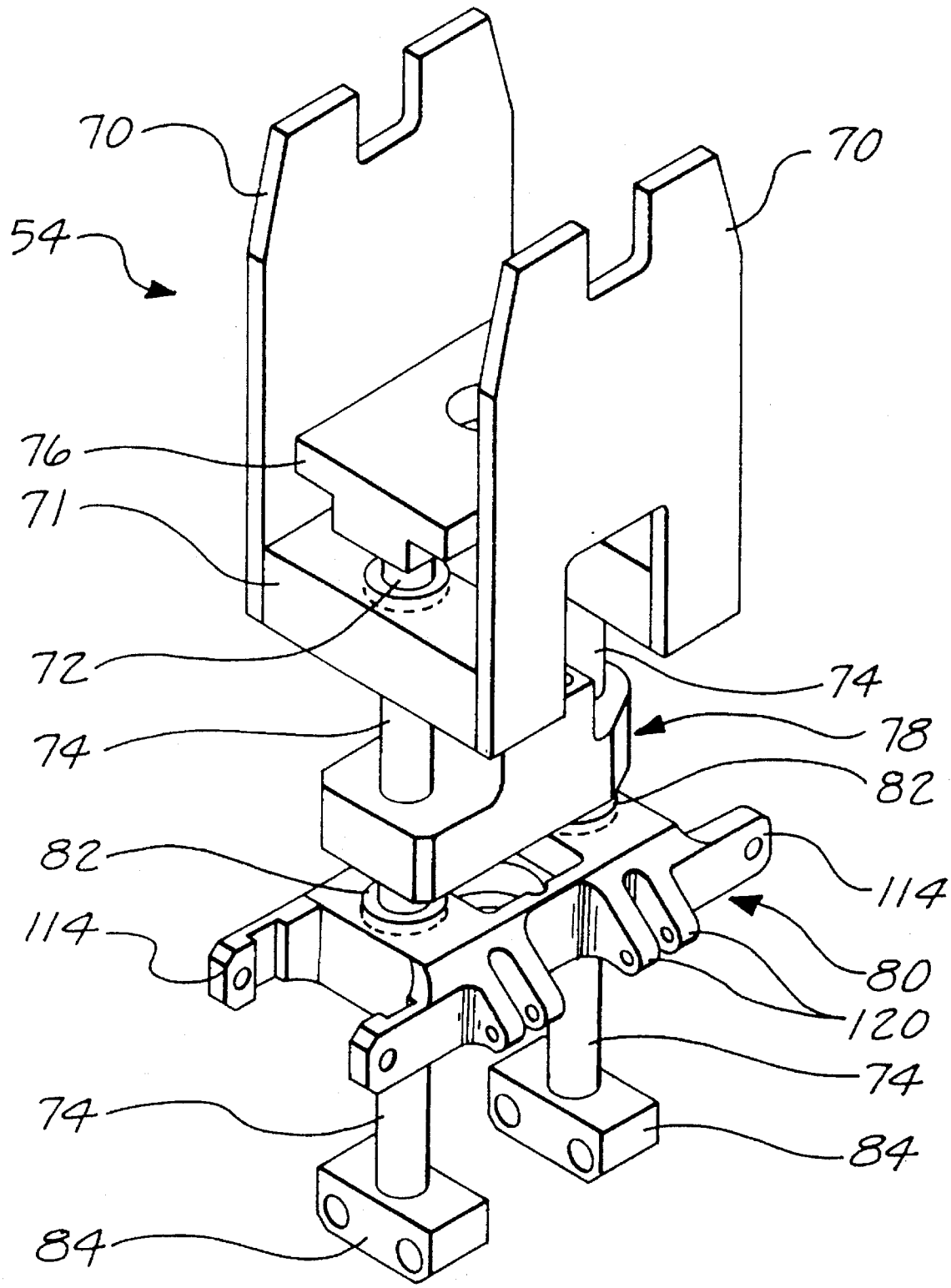
FIG. 10 is a perspective view of the extension and retraction mechanism of the mandrel manipulator of FIG. 2.

The articulating arm assembly 20 includes a push plate 80 that is slidably mounted on the two vertical support shafts 74 (FIG. 10) of the extension and retraction mechanism 54, below the bearing block 78. More specifically, the portion of the shafts 74 of the extension and retraction mechanism 54 that extends below the bearing plate 78 pass through two bushings 82 (FIG. 10) in the push plate 80. The bushings 82 allow the push plate 80 to slide up and down on the shafts 74. As will also be better understood from the following description, as the push plate 80 is moved up or down, it rotates the brackets 124, which, in turn, rotate the lay-up mandrels 24.

Mounted on the lower end of each shaft 74 of the extension and retraction mechanism 54 is an end block 84. The end blocks serve as pivot plates for multiple U-shaped arms 124 illustrated in FIG. 2 and described below.

The push plate 80 supports four downwardly extending drive links 128 (FIG. 2). The upper ends of the drive links 128 are rotatably attached by pins 131 to pairs of triangular flanges 120 that extend outwardly from opposite edges of the push plate 80. Two drive links 128 are located on each side of the push plate 80. Each pair of drive links rotatably supports a multiple U-shaped bracket 124. More specifically, each multiple U-shaped bracket includes a cross-member 133 that spans the distance between the related pair of drive links 128. See FIG. 11. One pair of arms 135 extend outwardly from the cross-member 133 in a first plane, and a second pair of arms 137 extend outwardly from the cross-member in a second plane. Thus, the cross-member and the first and second pairs of arms form two U-shapes. The planes in which the pairs of arms lie define an obtuse angle, as best seen in FIGS. 3–8.

Figure 11:
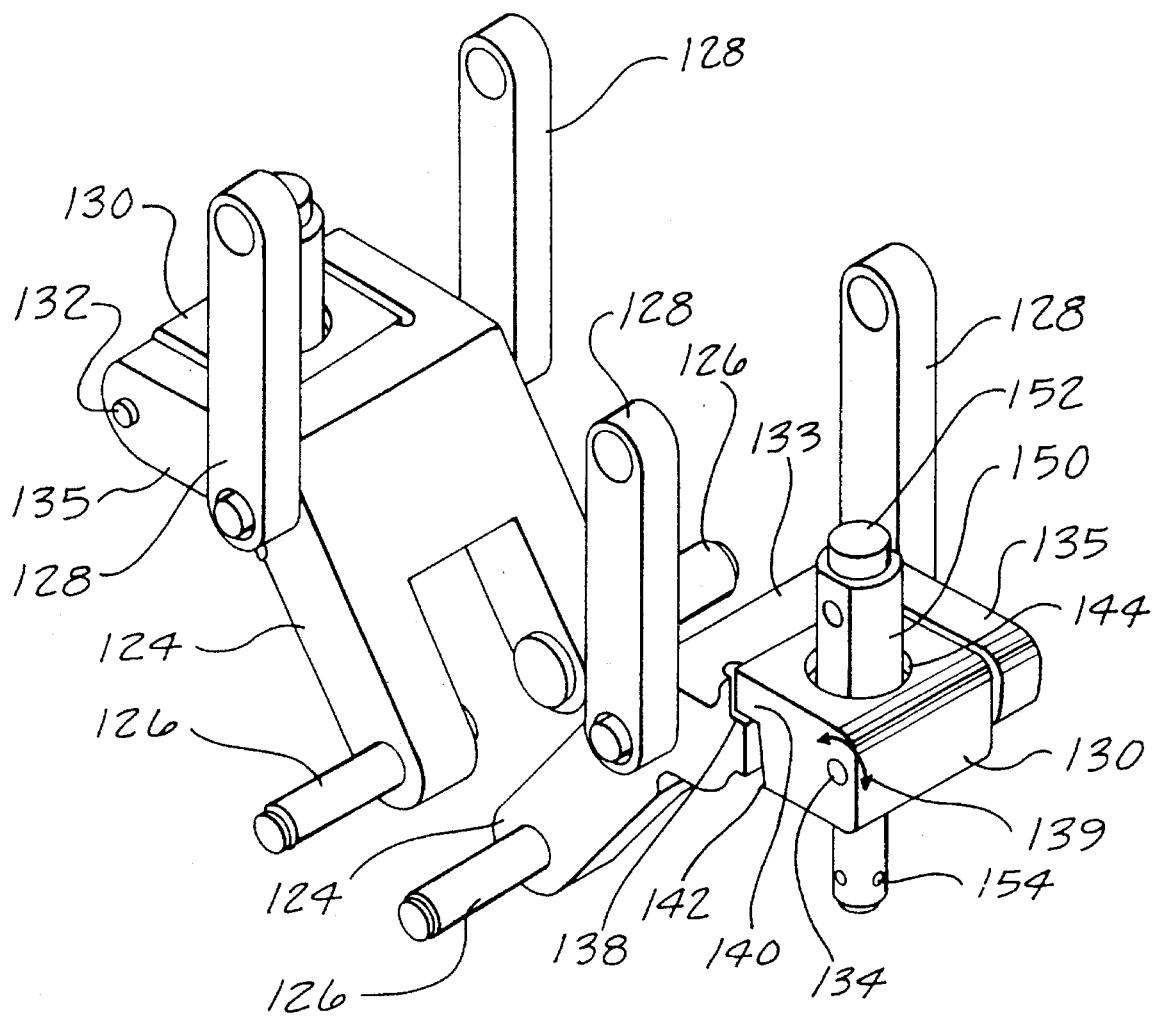
FIG.11 is a perspective, partial cut-away view of the opposing arms and pin blocks of the articulating arm assembly of the mandrel manipulator of FIG. 2.

A pin block 130 is pivotably mounted between the first pairs of arms 135 of each of the multiple U-shaped brackets 124. More specifically, the outer edge of each pivot block 130 is mounted between the outer ends of the first pair of arms 135 by pivot pins 132 (FIG. 2). The inner edge of each pivot block 130 is beveled and includes a ledge 140 (FIG. 11). The ledge 140 extends outward from the beveled wall 142 of the pivot block near the upper end thereof. The ledge 140 engages a shoulder 138 (FIG. 11) formed on the adjacent outer wall of the cross-member 133 of the bracket 124, near the lower end thereof.

The pivot block 130 is free to pivot clockwise or counterclockwise, as shown by arrow 139, in FIG. 11, until the ledge 140 contacts the shoulder 138. As will be better understood from the following description, the ability of the pivot block 130 to pivot slightly within the first pair of arms 135 of the bracket 124 helps to account for misalignment between articulating arm assembly 20 and composite lay-up mandrels 24 when they are set down on a table.

A lift pin 150 is slidably mounted in a hole 144 that passes orthogonally through each of the pin blocks 130. The lift pins 150 are sized such that one end has a larger diameter than the other end. The larger or upper end prevents the pins from sliding through the pin blocks 130 when the lift pins are vertically oriented as the mandrel manipulators are used in the manner described below. The smaller diameter end of the lift pins 130 includes a plurality of capture bearings 154 located about the circumference of the lift pins 150 near the outer end thereof. The capture bearings 154 are movable inwardly against a spring force (not shown) when a push button 152 located at the tip of the large diameter end of the lift pins is depressed. As will be better understood from the following description, the smaller diameter ends of the lift pins are sized to be received by receptacles in the composite lay-up mandrels 24 to be moved and manipulated by the overhead composite mandrel manipulator 21. The sizing is such that the smaller diameter ends of the lift pins readily slide into the mandrel receptacles when the push button is depressed so that the capture bearings can move inwardly and such that inserted pins are relatively rigidly attached to the mandrels when the push buttons are released.

Now referring to FIG. 11, the bearing block 78 of the extension and retraction mechanism 54 serves as a bearing support for a Thomson ball screw (FIG. 14). The Thomson ball screw is part of the drive mechanism of the articulating arm assembly. The drive mechanism also includes the motor 30 and a gear box 90, which are mounted atop and supported by the motor mount 76, so as to create a vertical drive shaft to which the shaft 99 of the Thomson ball screw is coupled.

The Thomson ball screw 98 is threaded through a drive block 100 mounted within a cavity 106 (FIG. 14) located in the top of the push plate 80. As will be better understood from the following description, as the shaft of the Thomson ball screw 98 rotates, the drive block 100, and thus push plate 80, are moved up or down. To improve clarity, the shaft 99 of the Thomson ball screw is illustrated as being threaded only over part of its length. However, the shaft of the Thomson ball screw is actually threaded over its entire length.

The drive block 100 houses a recirculating ball bearing nut 102 that surrounds the shaft 99 of the Thomson ball screw and a pressure block 104 that is mounted within the cavity 106. The pressure block 104 may move up and down within the cavity 106, but is maintained within the cavity by fasteners, retaining clips, or other suitable fastening means (not shown). The pressure block 104 is biased upward by Bellevue washers 108 so that its upper surface lies adjacent the upper surface of the drive block 80. The Bellevue washers 108 are placed between the bottom of the pressure block 104 and the bottom of the cavity 106.

As the shaft 99 of the Thomson ball screw 98 rotates, its threads engage the threads on the inside of the ball bearing nut 102, which forms the other main element of the Thomson ball screw. This engagement causes the ball bearing nut 102, pressure block 104, and push plate 80 to move up or down, depending upon the direction of rotation of the Thomson ball screw. If sufficient resistance is placed upon the push plate 80 by the multiple U-shaped brackets 124, as described below, the pressure block 104 moves down, within the cavity 106, against the biasing force of the Bellevue washers 108. When the pressure block 104-moves down a sufficient distance, it triggers a proximity sensor 112. Triggering the proximity sensor 112 disconnects the motor and stops the rotation of the shaft of the Thomson ball screw, as described below.

Figure 12:
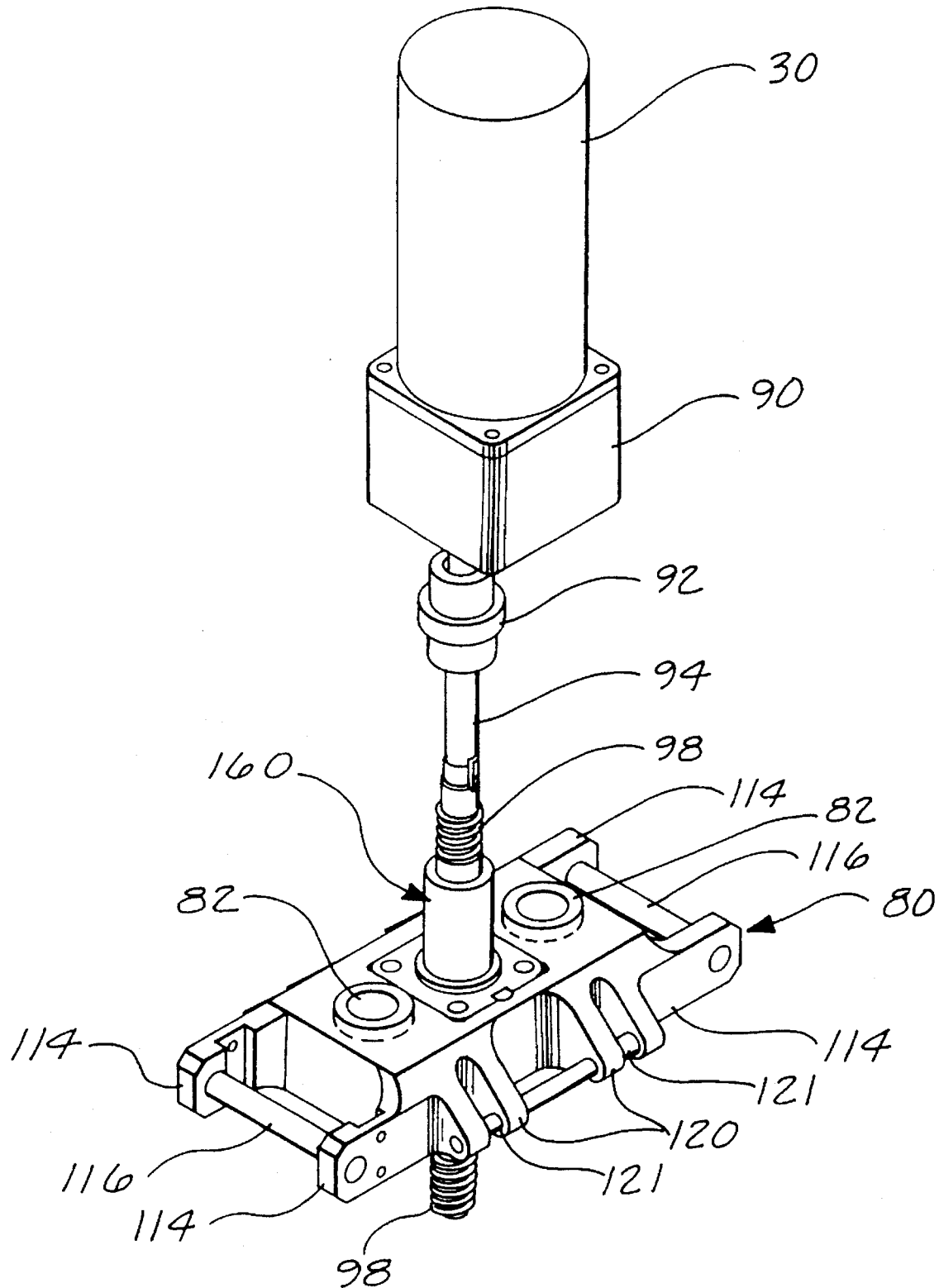
FIG. 12 is a perspective view of the drive motor and push block of the articulating arm assembly of the mandrel manipulator of FIG. 2.

The Thomson ball screw is rotated by the drive motor 30 via the gear box 90 (FIG. 12). The gear box 90 reduces the speed and increases the torque of the drive motor. The shaft 94 of the gear box 90 is rotatably mounted within the motor mount 76 (FIG. 10) by a bearing 92. The lower end of the shaft is coupled to the shaft of the Thomson ball screw by a coupling 92 (FIG. 12).

Pins 126 extend outwardly from the second pair of arms 137 of the multiple U-shaped brackets 124, as shown in FIG. 11. Mounted on the pins are the end blocks 84 attached to the lower ends of the vertical shafts 74 of the extension and retraction mechanism 54. The attachment is such that the end blocks are coupled to an arm 137 of each of the multiple U-shaped brackets. The end blocks span the space between the brackets, not the space between the arms of the same bracket. Thus, the end blocks are attached to different brackets 124 whereas the pivot blocks are attached to the same brackets 124.

As the push plate 80 is moved up or down by the action of the Thomson ball screw 98, the upper end of the drive links 128 are moved up or down. This movement causes the multiple U-shaped brackets 124 to rotate around the pivot pins 126, as best seen in FIGS. 5–8, which depict the operation of the invention as described next.

In operation, the support beams 28 are moved so that the articulating arm assemblies 20 are directly above two composite lay-up mandrels 24. See FIGS. 2 and 3. The support beams 28 may be moved using an overhead crane or similar device. Once properly positioned, the operator moves each arm assembly 20 downward by pulling down on the handles 114 (FIG. 2). The constant tension springs 52 provide sufficient force to bias the unloaded arm assembly 20 into its upward position but do not provide an excessive force to prevent an operator from easily moving the arm assembly downward.

Each articulating arm assembly is positioned over the lay-up mandrels 24 so that holes 144 in the pin blocks 130 are aligned with corresponding receptacles 156 (FIG. 5) in the lay-up mandrels. Once the arms 124 are in position adjacent the lay-up mandrels 24, an operator slides a lift pin 150 (FIG. 2) through the hole 144 in the pin block aligned with a receptacle 156 in the lay-up mandrel. During insertion the capture bearings 154 are allowed to retract by the operator depressing the button 152 located on the upper end of the lift pins. After insertion, the button is released, which causes the extended capture bearings 154 to engage an insert 158 (FIG. 5) in the lay-up mandrel receptacle 156 in which the pin is inserted. This engagement prevents the lift pin 150 from moving out of the lay-up mandrel 24 until the button 152 is again depressed. Once all of the lift pins 150 are properly positioned, the support beam 28, and thus the articulating arm assemblies 20 and attached lay-up mandrels 24, are elevated.

Figure 6:
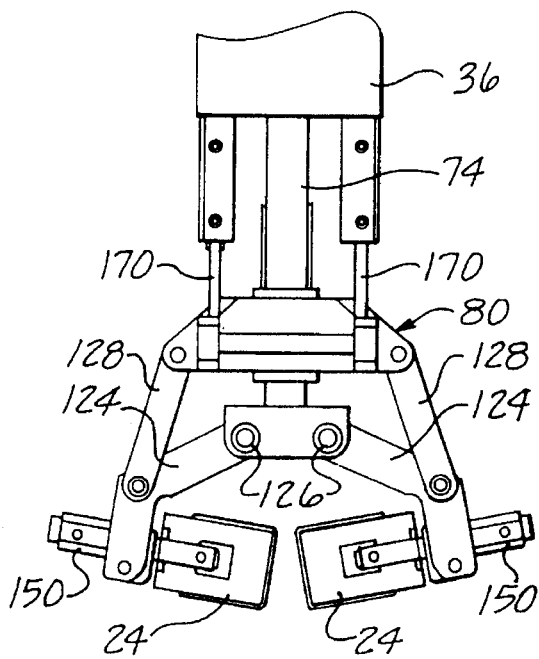
FIG. 6 is an enlarged side view of a portion of the mandrel manipulator of FIG. 2 illustrating the brackets in a partially closed position.
Figure 5:
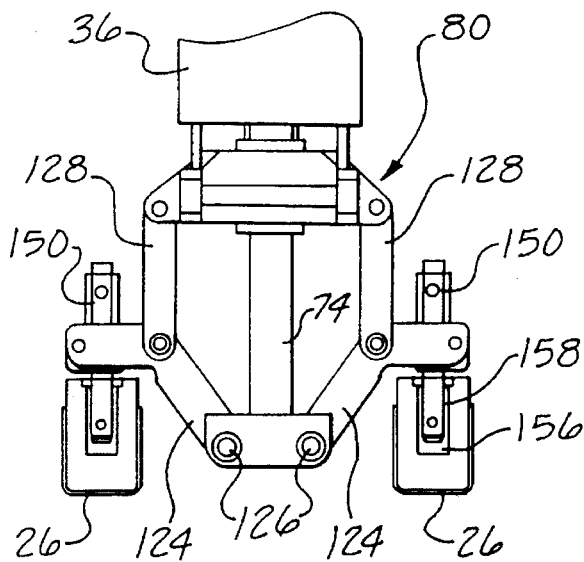
FIG. 5 is an enlarged side view of a portion of the mandrel manipulator of FIG. 2 illustrating the brackets in an open position.
Figure 7:
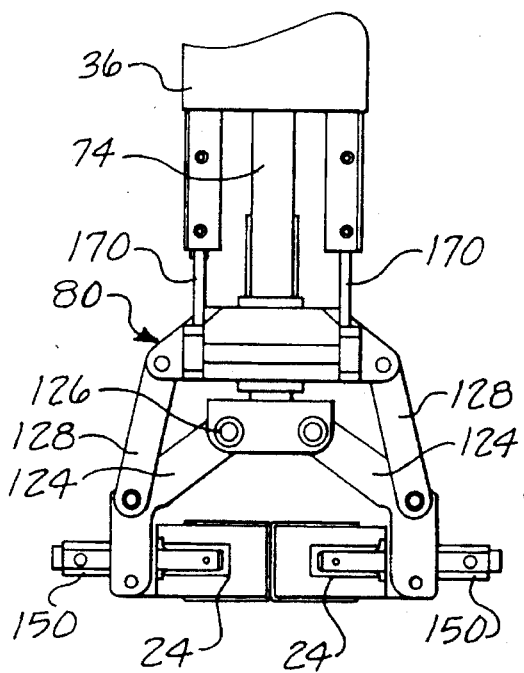
FIG. 7 is an enlarged side view of a portion of the mandrel manipulator of FIG. 2 illustrating the brackets in a closed and compressed position.

FIGS. 5–7, the manipulator is shown forming composite I-beams. Using equipment that does not form part of the present invention, composite charges 26 are formed into C-channels around the lay-up mandrels by vacuum forming or another suitable method after the mandrels are positioned in the equipment. After the C-channels are formed, the lay-up mandrels 24 are re-attached to and picked up by the articulating arm assemblies 20 (FIG. 5). Next, the lay-up mandrels 24 are rotated approximately 90°, as illustrated in FIG. 6. This is accomplished by moving the push plate 80 downward by energizing the drive motor 30 and rotating the shaft of the Thomson ball screw 98. As the push plate 80 moves downward, it pushes the drive links 128 downward. This movement causes the multiple U-shaped brackets 124 and, thus, the lay-up mandrels, to rotate about the pivot pins 126 (FIG. 6) because the second pair of arms 137 of the multiple U-shaped brackets 124 are connected to the end blocks 84. In the embodiment shown, the rotation of the brackets 124 and the lay-up mandrels 24 is halted when the mandrels are approximately one-half inch apart to prevent the formed composite C-channels from touching each other.

The lay-up mandrels 24 are then lowered onto the table of additional fabrication equipment. The pin blocks 130 rotate slightly as the mandrels contact the table. Once on the table, the pins are withdrawn and the articulating arm assemblies moved out of the way. The additional fabrication equipment pushes the lay-up mandrels together to join the two C-channels 26 along their vertical webs. Further, fillers are applied to the top and bottom intersections of the two C-channels and additional reinforcing cap plies added to create a composite I-beam.

Figure 8:
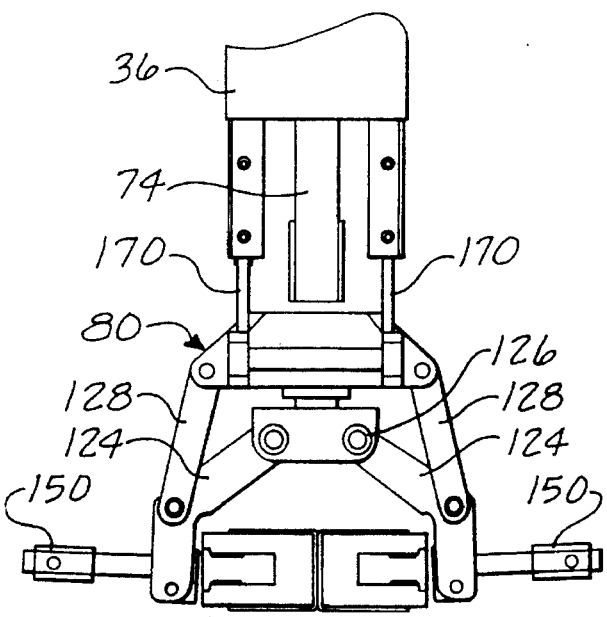
FIG. 8 is an enlarged side view of a portion of the mandrel manipulator of FIG. 2 illustrating the brackets in a closed and released position.

After the composite charges 26 are joined to form an I-beam, the articulating arm assemblies are reattached to the lay-up mandrels, as illustrated in FIG. 8. In this position, ⅛ inch clearance is provided to easily insert the lift pins. After the lift pins 150 have been inserted, the push plate 80 is moved further downward to apply a compressive force to the lay-up mandrels 24. This compressive force prevents the lay-up mandrels 24, and thus I-beams, from moving apart during subsequent movement of the mandrels to the next fabrication station.

The compressive force applied to the lay-up mandrels is regulated by the strength of the Bellevue washer 108 (FIG. 14). As a greater compressive force is applied to the mandrels, the pressure block 104 slowly compresses the Bellevue washer 108. When the pressure block 104 has moved downward a sufficient distance, a proximity target 110 mounted on the pressure block triggers the proximity sensor 112. Triggering the proximity sensor 112 sends a control signal to the control system to stop the movement of the drive motor 30. This configuration also allows a constant force to be applied to the mandrels and composite I-beam regardless of width variations.

After the lay-up mandrels are compressed together, they may be picked up and moved to additional fabrication stations, such as vacuum bagging and curing. Once the lay-up mandrels have been moved to the proper location, the mandrels are set down, the compressive force is relieved, and the lift pins 150 are removed as illustrated in FIG. 8.

Figure 13:
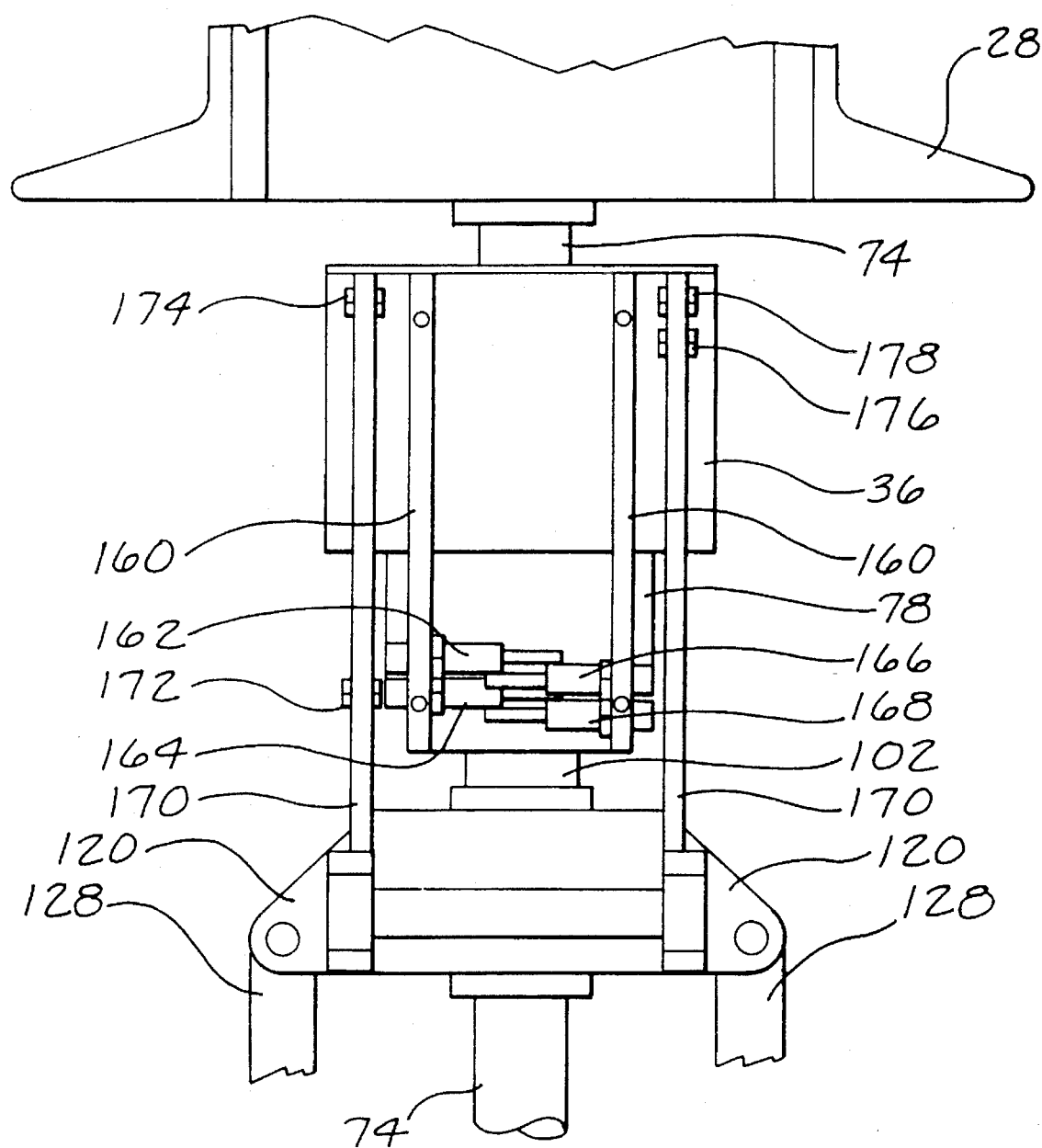
FIG. 13 is a partially cut-away side view of the sensing box of the mandrel manipulator of FIG. 2.

The various operating positions of the articulating arm assemblies 20 are regulated by electrical outputs from the sensing box 36 (FIG. 2). The sensing box 36 (FIG. 13) encloses two opposing rods 170 that are rigidly attached to and extend upward from one side of the push plate 80. The exterior of the sensing box 36 is rigidly mounted to the bearing block 78 by two mounting rods 160. Thus, as the push plate 80 moves up and down, the rods 178 move up and down with respect to the mounting rods 160.

Two proximity sensors are mounted on each of the mounting rods 160. The proximity targets used to trigger the proximity sensors are mounted on the rods 178. The combination of the proximity sensors and proximity targets provide information regarding the position of the arms 124 to the control panel 32.

The full-open proximity sensor 164 is triggered by a target 172 mounted on rod 170. The target 172 is positioned on the rod 170 so that it triggers the full-open proximity sensor when the articulating arm assembly is in the full open position illustrated in FIG. 5. Similarly, the half inch open proximity sensor 162 is triggered by the target 174 when the articulating arm assembly is in the half inch open position illustrated in FIG. 6. The loose connection proximity sensor 168 is triggered by the target 176 when the articulating arm assembly is in the loose closed position illustrated in FIG. 8. The full-down proximity sensor 166 is triggered by the target 178 when the articulating arm is at its maximum closed position. The full proximity sensor 166 is only triggered when a lay-up mandrel assembly is not attached to the articulated arm assembly. When a lay-up mandrel is present, the proximity switch 112 (FIG. 14) will be triggered prior to when the articulating arm assembly is at its maximum closed position. When one of the proximity sensors is triggered, it provides an electrical signal to the control panel 32. The control panel uses the information provided by the proximity sensors to stop the articulating arm assembly at the orientation requested by the operator.

The electrical control system, such as a programmable logic controller, may also include safety interlocks to prevent the articulating arm assembly from being operated in an unsafe manner. For example, sensors may be used to sense when lay-up mandrels are present within the articulating arm assembly and when they are being rotated. The information provided by such sensors may be used to trigger interlocks to prevent the articulating arm assembly from being moved to an open position when a composite I-beam section including mandrels is located within the articulating arm assembly.

While the preferred embodiment of the invention has been illustrated and described, it is to be understood that within the scope of the appended claims various changes can be made therein.

The embodiments of the invention in which an exclusive property or privilege is claimed are defined as follows:

1. An overhead manipulator for manipulating two composite lay-up mandrels, the manipulator comprising:
    (a) an overhead support;
    (b) a plurality of articulating arm assemblies, each of said articulating arm assemblies including:
        1) a support plate;
        2) a pair of opposed brackets, each of said brackets including at least one outwardly extending arm, said brackets being rotatably coupled to said support plate such that the arms of said brackets are movable between an open position, in which the outer ends of the arms lie in approximately the same plane, and a closed position, in which the outer ends of the arms face each other;
        3) attachment means for releasably attaching each of said arms to one of two composite lay-up mandrels;
        4) a drive motor;
        5) coupling means for coupling said drive motor to said pair of opposed arms such that the operation of said drive motor moves said arms between said open and said closed positions; and
    (c) an extension and retraction mechanism for coupling said plurality of articulating arm assemblies to said overhead support such that said articulating arm assemblies are movable vertically between a retracted position in which the articulating arm assemblies are adjacent to the overhead support and an extended position in which the articulating arm assemblies are spaced away from the overhead support.

2. The overhead manipulator of claim 1, wherein the attachment means includes a pair of pin blocks, one of said pin blocks pivotally coupled to the outer end of each arm and a pair of lift pins, one of said lift pins mounted in each of said pin blocks.

3. The overhead manipulator of claim 2, wherein said lift pins are reversibly insertable through the pin blocks.

4. The overhead manipulator of claim 1, wherein said extension and retraction mechanism includes biasing means for biasing said articulating arm assemblies into said retracted position.

5. The overhead manipulator of claim 1, wherein said opposed brackets create a compression force when two composite lay-up mandrels are attached to said arms and said arms are in said closed position.

6. The overhead manipulator of claim 5, further comprising means for preventing said compression force from exceeding a predetermined value.

7. The overhead manipulator of claim 1, wherein said overhead support comprises a pair of spaced-apart channels.

8. The overhead manipulator of, wherein said extension and retraction mechanism comprises:
    a bracket mounted between said pair of spaced-apart channels;
    a pair of vertical shafts mounted in said bracket;
    a motor mount mounted to the upper ends of said vertical shafts, said drive motor being supported by said motor mount; and
    a coupling mechanism for coupling the lower ends of said shaft to said pair of opposed brackets.

9. The overhead manipulator of claim 8, wherein said pair of opposed brackets include two pairs of outwardly extending arms and a cross-member, said pair of arms and said cross-member joined such that said bracket is a multiple U-shape, the multiple U's of said U-shape extending outwardly from said cross-member in two planes that define an obtuse angle between the planes and wherein said pair of opposed brackets are rotatably coupled to said support plate by links that are pinned to said support plate at one end and pinned to said cross-member at the other end.

10. The overhead manipulator of claim 9, wherein said attachment means includes a pair of pin blocks, one of said pin blocks mounted between one pair of arms of each of said brackets and a pair of lift pins, one of said lift pins mounted in each of said pin blocks.

11. The overhead manipulator of claim 1, including a Thomson ball screw for coupling said drive motor to said support plate such that the energization of said drive motor causes said support plate to move upwardly and downwardly.

12. The overhead manipulator of claim 1, wherein said extension and retraction mechanism includes biasing means for biasing said articulating arm assemblies into said retracted position.

13. The overhead manipulator of claim 1, wherein said opposed brackets create a compression force when two composite lay-up mandrels are attached to said arms and said arms are in said closed position.

14. The overhead manipulator of claim 13, further comprising means for preventing said compression force from exceeding a predetermined value.

* * * * *

UNITED STATES PATENT AND TRADEMARK OFFICE
CERTIFICATE OF CORRECTION

PATENT NO. : 5,482,340                                  Page 1 of 2

DATED : January 9, 1996

INVENTOR(S) : D.A. Jensen et al.

It is certified that error appears in the above-indentified patent and that said Letters Patent is hereby corrected as shown below:

| COLUMN | LINE | |
|---|---|---|
| Title page, item [75] | Inventors | "Donald A. Jensen, Kent; Hassan Faraz, Bothell; Joel M. Thomas, Kent, all of Wash." should read --Donald A. Jensen, Kent and Hassan Faraz, Bothell, both of Wash.-- |
| 1 | 10 | "INVENITON" should read --INVENTION-- |
| 1 | 58 | After "I-beam" insert --.-- |
| 3 | 25 | "DRAWING" should read --DRAWINGS-- |
| 4 | 23 | "1-beams." should read --I-beams.-- |
| 4 | 24 | "1-beams" should read --I-beams-- |
| 4 | 29 | "1-beams" should read --I-beams-- |
| 4 | 34 | After "assembly 20" delete --.-- |
| 5 | 64 | "pins 13 1" should read --pins 131-- |
| 7 | 26 | "104-moves" should read --104 moves-- |

UNITED STATES PATENT AND TRADEMARK OFFICE
CERTIFICATE OF CORRECTION

PATENT NO. : 5,482,340

DATED : January 9, 1996

INVENTOR(S) : D.A. Jensen et al.

It is certified that error appears in the above-indentified patent and that said Letters Patent is hereby corrected as shown below:

| COLUMN | LINE | |
|---|---|---|
| 8 | 18 | Before "FIGS. 5-7," insert --In-- |
| 10 (Claim 8, | 54 line 1) | "of," should read --of Claim 7,-- |

Signed and Sealed this

Fourteenth Day of May, 1996

Attest:

BRUCE LEHMAN

Attesting Officer

Commissioner of Patents and Trademarks